US007279667B2

(12) United States Patent
Kubo

(10) Patent No.: US 7,279,667 B2
(45) Date of Patent: Oct. 9, 2007

(54) IMAGE FORMING APPARATUS

(75) Inventor: Isao Kubo, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 48 days.

(21) Appl. No.: 11/387,911

(22) Filed: Mar. 24, 2006

(65) Prior Publication Data

US 2006/0227201 A1 Oct. 12, 2006

(30) Foreign Application Priority Data

Mar. 31, 2005 (JP) ............................ 2005-104453

(51) Int. Cl.
*G01J 1/32* (2006.01)
*B41J 2/385* (2006.01)

(52) U.S. Cl. ...................... 250/205; 250/234; 347/133; 347/246

(58) Field of Classification Search ................ 250/205, 250/234, 235, 236; 347/132, 133, 135, 246, 347/247; 399/220
See application file for complete search history.

(56) References Cited

U.S. PATENT DOCUMENTS 5,678,132 A * 10/1997 Shiba et al. .................. 399/59
2005/0219990 A1* 10/2005 Inukai ........................ 369/116

FOREIGN PATENT DOCUMENTS

| | | |
|---|---|---|
| JP | 3-58065 | 3/1991 |
| JP | 6-141582 | 5/1994 |
| JP | 9-58048 | 3/1997 |
| JP | 10-37067 | 12/1998 |
| JP | 2001-219593 | 8/2001 |

* cited by examiner

*Primary Examiner*—Kevin Pyo
(74) *Attorney, Agent, or Firm*—McDermott Will & Emery LLP

(57) ABSTRACT

An image forming apparatus includes an exposure unit, a developing unit and a transferring unit that transfers a visualized image of developer to an image recording medium. The exposure unit includes a light emitting unit, a detecting unit that detects a quantity of light, a reference voltage generating portion that generates a reference voltage set in accordance with a targeted value of the quantity of light, an emitted-light quantity control circuit that controls the quantity of light emitted from the light emitting unit so that a detection voltage becomes equal to a value of the reference voltage, and a reference voltage control portion that controls the reference voltage generating portion so as to change the reference voltage at a predetermined rate in stages. A new reference voltage is based on a density of the image of the developer obtained after being changed when the density is changed.

5 Claims, 4 Drawing Sheets

DENSITY LEVEL AFTER BEING CHANGED (columns) / DENSITY LEVEL BEFORE BEING CHANGED (rows)

| | 1 | 2 | 3 | 4 | 5 | 6 |
|---|---|---|---|---|---|---|
| 1 | | 1 | 2 | 3 | 4 | 5 |
| 2 | -1 | | 1 | 2 | 3 | 4 |
| 3 | -2 | -1 | | 1 | 2 | 3 |
| 4 | -3 | -2 | -1 | | 1 | 2 |
| 5 | -4 | -3 | -2 | -1 | | 1 |
| 6 | -5 | -4 | -3 | -2 | -1 | |

IMAGE FORMING APPARATUS

CROSS REFERENCE TO RELATED APPLICATION

This application claims priority from Japanese Patent Application No. 2005-104453, filed on Mar. 31, 2005, the entire subject matter of which is incorporated herein by reference.

TECHNICAL FIELD

Aspects of the present invention relate to an image forming apparatus for forming an image by developing an electrostatic latent image formed on a photosensitive member by use of developer.

BACKGROUND

Conventionally, the following exposure unit is known as an exposure unit for forming an electrostatic latent image in an image forming apparatus. The exposure unit includes a laser diode that forms an electrostatic latent image by projecting light onto a photosensitive member, a photodiode that detects the quantity of light emitted from the laser diode, a CPU that generates an output voltage corresponding to the present emitted-laser-light quantity detected by the photodiode, a reference voltage generating portion that generates a reference voltage corresponding to a set print density, and an emitted-light quantity control unit that makes a comparison between the detection value of the emitted-light quantity and the output voltage generated by the CPU and controls the quantity of light emitted from the laser diode in accordance with a quantitative relationship therebetween.

In this image forming apparatus, when the emitted-light quantity of the laser diode is controlled to increase from a state in which the laser diode does not emit light to a state of reaching an emitted-light quantity corresponding to the reference voltage, the CPU increases the output voltage two-step by two-step for a while for which the detection voltage detected by the photodiode becomes equal to a pre-set voltage, and increases the output voltage one-step by one-step for a while for which the detection voltage exceeds the pre-set voltage and reaches a targeted voltage (see JP-A-3-5865, for example).

SUMMARY

As described above, in this image forming apparatus, the quantity of light emitted from the laser diode can be excellently controlled when the emitted-light quantity of the laser diode is controlled to increase from a state in which the laser diode does not emit light to a state of reaching an emitted-light quantity corresponding to the reference voltage.

However, in this image forming apparatus, the reference voltage generated by the reference voltage generating portion must be changed when the print density is changed. Therefore, for example, if this reference voltage is changed during an image forming operation, a potential difference between the voltage output from the CPU and the detection value of the emitted-laser-light quantity will become large, and hence there is a possibility that an overcurrent will flow to the laser diode, or an electric current necessary to emit light from the laser diode cannot be supplied.

Additionally, according to the image forming apparatus, the detection voltage detected by the photodiode is taken into the CPU, and hence, a structure to subject the detection voltage to an A/D conversion is needed. Also, a detection voltage value detected by the photodiode is a generally slight voltage value, and hence, the setting of a dynamic range becomes difficult when the detection voltage is subjected to an A/D conversion, and, depending on the setting thereof, the accuracy of the quantity of light emitted from the laser diode is lowered.

Aspects of the present invention provide an image forming apparatus, in which an image is formed by developing an electrostatic latent image formed on a photosensitive member by use of developer, capable of controlling the amount of electricity supplied to a light emitting unit, such as a laser diode, with a simplified structure and with excellent accuracy when the print density is changed.

According to an aspect of the invention, there is provided an image forming apparatus including: an exposure unit that forms an electrostatic latent image by projecting light onto a surface of an charged photosensitive member; a developing unit that visualizes the electrostatic latent image formed by the exposure unit with developer; and a transferring unit that transfers a visualized image of the developer to an image recording medium; wherein the exposure unit includes: a light emitting unit that generates the light projected onto the surface of the photosensitive member; a detecting unit that detects a quantity of light emitted from the light emitting unit; a reference voltage generating portion that generates a reference voltage set in accordance with a targeted value of the quantity of light emitted from the light emitting unit; an emitted-light quantity control circuit that controls the quantity of light emitted from the light emitting unit so that a detection voltage detected by the detecting unit becomes equal to a value of the reference voltage generated by the reference voltage generating portion; and a reference voltage control portion that controls the reference voltage generating portion so as to change the reference voltage at a predetermined rate in stages from a present reference voltage to a new reference voltage, the new reference voltage being based on a density of the image of the developer obtained after being changed when the density is changed.

Therefore, according to the thus structured image forming apparatus, since the reference voltage control portion changes the reference voltage generated by the reference voltage generating portion at a predetermined rate from the present reference voltage to the new reference voltage based on the density obtained after being changed, the quantity of light emitted from the light emitting unit can be improved in accuracy without making the structure complex.

BRIEF DESCRIPTION OF THE DRAWINGS

Illustrative aspects of the invention may be more readily described with reference to the accompanying drawings.

DETAILED DESCRIPTION

Aspects of the present invention will be hereinafter described with reference to the drawings.

<Whole Structure of Image Forming Apparatus>

Figure 1:
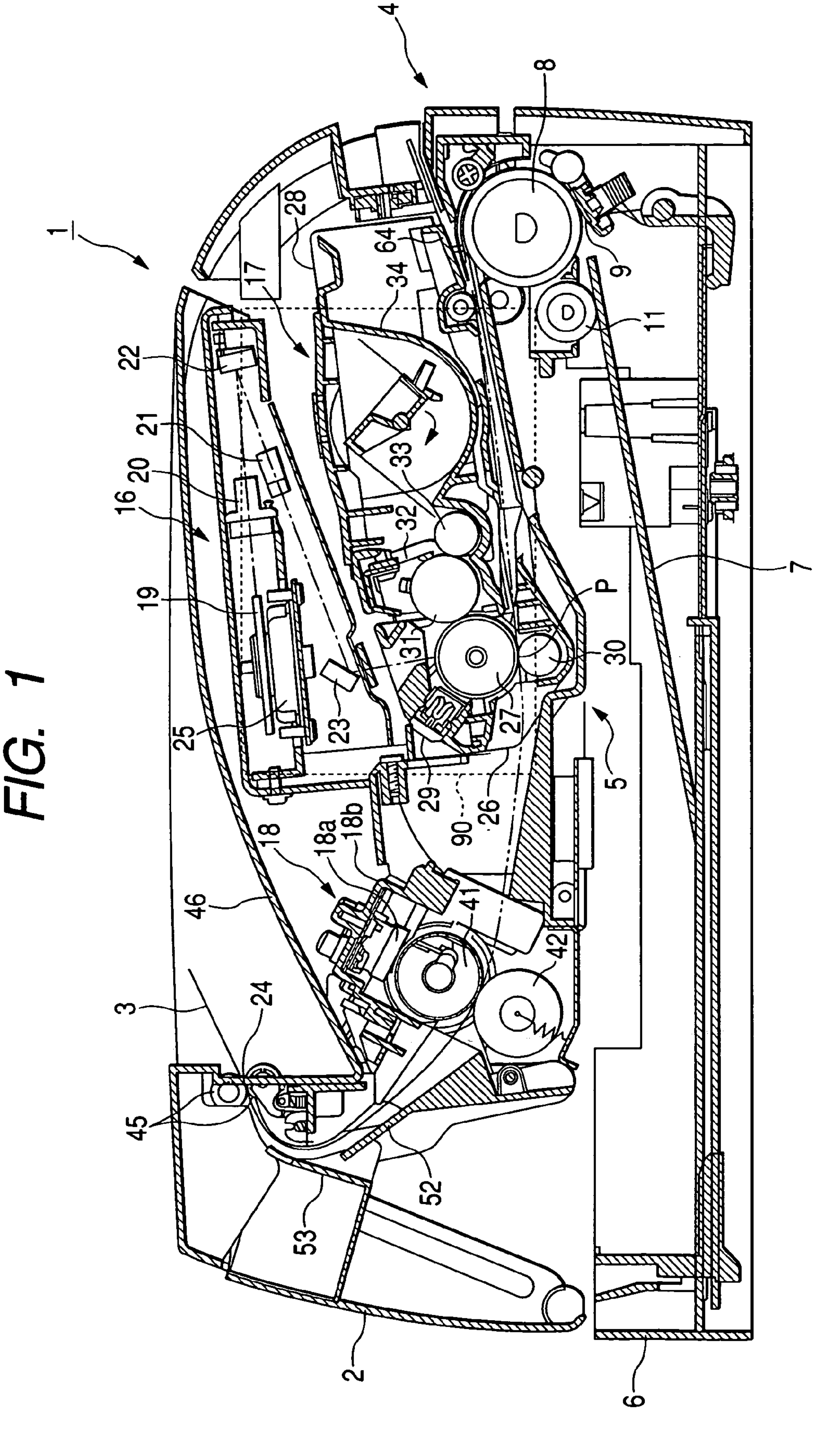
FIG. 1 is a sectional side view of a printer.

FIG. 1 is a sectional side view of a printer 1 (i.e., an image forming apparatus). In FIG. 1, the printer 1 is viewed from the axial direction of each roller described later, and hence, let the right side of the figure be a front side, and let the left side thereof be a rear side.

In FIG. 1, the printer 1 contains a feeder portion 4 that feeds sheets of paper 3 (i.e., an image recording medium) and an image forming portion 5 that forms a predetermined image on the fed sheet of paper 3 in a main casing 2. The sheet of paper 3 on which an image has been formed by the printer 1 is discharged to a discharge tray disposed on the upper part of the printer 1.

The feeder portion 4 is made up of a paper feed tray 6, a paper pressing plate 7 disposed in the paper feed tray 6, a delivery roller 11 disposed above one side end of the paper feed tray 6, a paper feed roller 8, and a separation pad 9. The sheets of paper 3 stacked up on the paper pressing plate 7 are delivered by the delivery roller 11, and are fed to the image forming portion 5 one by one by the paper feed roller 8 and the separation pad 9.

The image forming portion 5 is made up of a scanner unit 16 (i.e., an exposure unit), a process unit 17, and a fixing unit 18.

The scanner unit 16 is disposed on the upper part in the main casing 2, and is made up of a laser diode 85 (see FIG. 3), a laser diode (LD) control circuit 81 that controls the light emission of the laser diode 85 (see FIG. 3), a polygon mirror 19 rotationally driven by a polygon motor 25, lenses 20 and 21, and reflecting mirrors 22 and 23. As shown by the alternate long and short dash line in FIG. 1, a laser beam that is based on predetermined image data and that is emitted from the laser diode 85 is allowed to pass through the polygon mirror 19, the lens 20, the reflecting mirror 22, the lens 21, and the reflecting mirror 23 in this order, or is reflected thereby, and is projected by high-speed scanning onto the surface of a photosensitive drum 27 in the process unit 17 described later.

In more detail, in the scanner unit 16, the polygon mirror 19 is disposed directly above the photosensitive drum 27 and an image formation position P, described later. A laser beam reflected by the polygon mirror 19 travels substantially horizontally toward the reflecting mirror 22. The laser beam is then reflected by the reflecting mirror 22 toward the reflecting mirror 23 disposed immediately under the polygon mirror 19. In other words, the reflecting mirror 22 reflects the incoming laser beam with an acute angle downwardly by about fifteen degrees from the horizontal direction. The scanner unit 16 including these elements (the polygon mirror 19, the lenses 20 and 21, and the reflecting mirrors 22 and 23) is formed to have such a size and shape as not to block the optical path of the laser beam. That is, the upper surface (upper plate) of the scanner unit 16 is disposed substantially horizontally (strictly speaking, disposed slantingly so that a part more distant from the paper feed roller 8 becomes lower). The lower surface (lower plate) of the scanner unit 16 is inclined more greatly than the upper surface so that the part more distant from the paper feed roller 8 becomes lower. Therefore, the scanner unit 16 is shaped so that the side of the image formation position P where the polygon mirror 19 is disposed is thicker and so that the side of the paper feed roller 8 is more thinly tapered.

The process unit 17 is disposed under the scanner unit 16, and is attached to the main casing 2 detachably in the substantially horizontal direction and in the forward and rearward directions (rightward and leftward directions in FIG. 1: attaching and detaching directions). The process unit 17 is made up of a drum cartridge 26 and a developing cartridge 28. A space is formed between the process unit 17 and the scanner unit 16.

The drum cartridge 26 of the process unit 17 includes a photosensitive drum 27 (i.e., a photosensitive member) on which a latent image is formed by the scanner unit 16, a scorotron type charger 29 that charges the surface of the photosensitive drum 27, and a transfer roller 30 (i.e., a transfer unit) that transfers a toner image formed on the surface of the photosensitive drum 27 to the sheet of paper 3.

The developing cartridge 28 includes a developing roller 31 (i.e., a developing unit), a thickness restricting blade 32, a toner supply roller 33, and a toner box 34. The developing cartridge 28 is detachably attached to the drum cartridge 26, and supplies toner to the photosensitive drum 27 on which a latent image has been formed so as to make the latent image visible.

The fixing unit 18 is to fix the toner image formed on the sheet of paper 3, and is disposed on the downstream side (rear side) in the paper conveying direction from the process unit 17. The fixing unit 18 includes a fixing roller 41 on which toner is melted with heat and a pressing roller 42 that presses the sheet of paper 3 conveyed between the fixing roller 41 and pressing roller 42 and fixes the melted toner to the sheet of paper 3. The fixing roller 41 and a thermostat 18*a* are covered with a cover 18*b*.

In the thus structured fixing unit 18, the fixing roller 41 fixes the toner transferred onto the sheet of paper 3 in the process unit 17 by heating and pressing while the sheet of paper 3 is passing between the fixing roller 41 and the pressing roller 42. Further, the fixing roller 41 conveys the sheet of paper 3 onto which the toner (image) has been fixed to discharge rollers 45 via a paper discharge pass made up of guide members 52 and 53. The discharge rollers 45 discharge the sheet of paper 3 conveyed there onto the discharge tray. The pair of discharge rollers 45 functions as an outlet 24 through which the sheet of paper 3 is discharged outwardly from the printer 1.

In the printer 1, a substrate 90 on which a control unit 71 that controllably drives the various rollers, the polygon mirror 19, etc., is mounted is disposed on both sides of a conveying path along which the sheet of paper 3 is conveyed as shown by the broken line in FIG. 1.

<With Regard to Control System>

Figure 2:
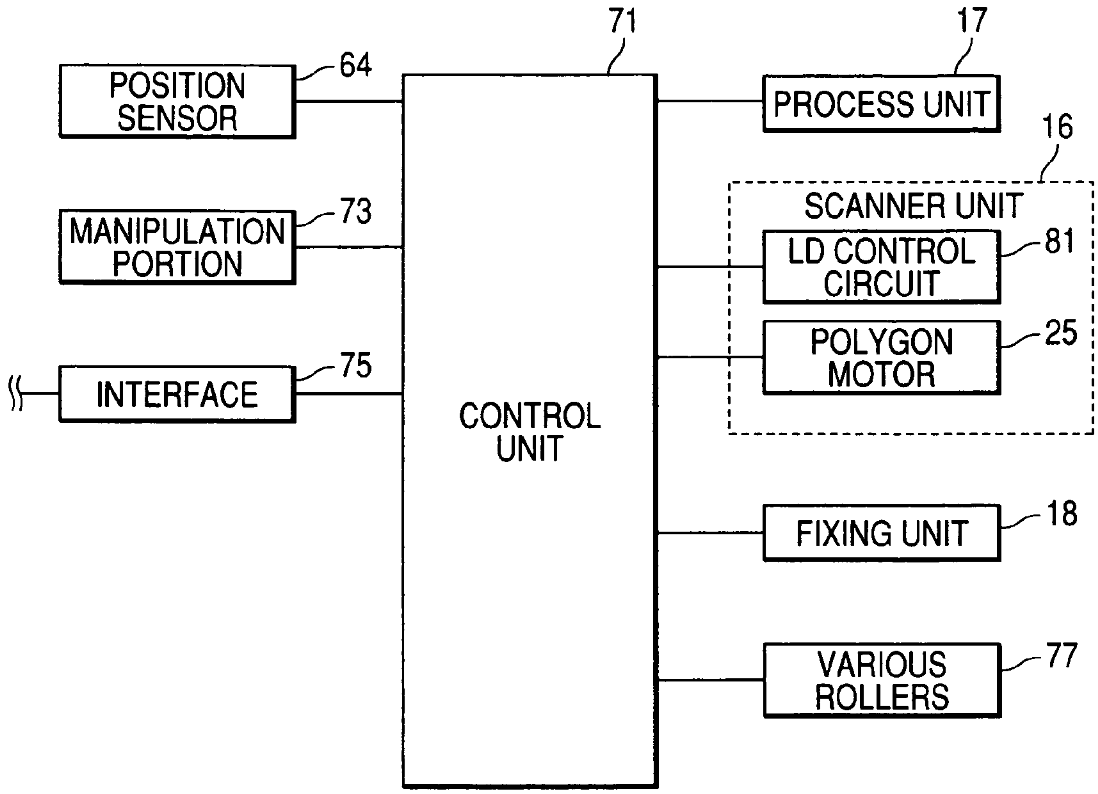
FIG. 2 is a block diagram showing an electric connection relationship of the printer.

Next, a control system of the printer 1 will be described with reference to FIG. 2. FIG. 2 is a block diagram showing an electric connection relationship of the printer 1.

As shown in FIG. 2, the control system of the printer 1 has a control unit 71 (i.e., a reference voltage generating portion, a PWM signal generating portion, and a reference voltage control portion) serving as a primary component.

The control unit 71 is structured as a known microcomputer including a CPU (or ASIC), a ROM, etc., and has a drive circuit (not shown) that drives elements constituting the printer 1. The control unit 71 controls the elements constituting the printer 1 based on a program stored in the ROM, external commands (a print command, a setting change command, a command input from the manipulation portion 73, etc.) input from external devices (personal computers, etc.) connected via an interface 75, a detection result of a position sensor 64, and so on.

In more detail, the process unit 17, the scanner unit 16, the fixing unit 18, and the various rollers 77 (e.g., the paper feed roller 8, the discharge roller 45, etc.) not included in these units are connected to the control unit 71, and these units and rollers connected thereto are controlled, thus forming an image on the sheet of paper 3 while conveying the sheet of paper 3.

<With Regard to LD Control Circuit>

Figure 3:
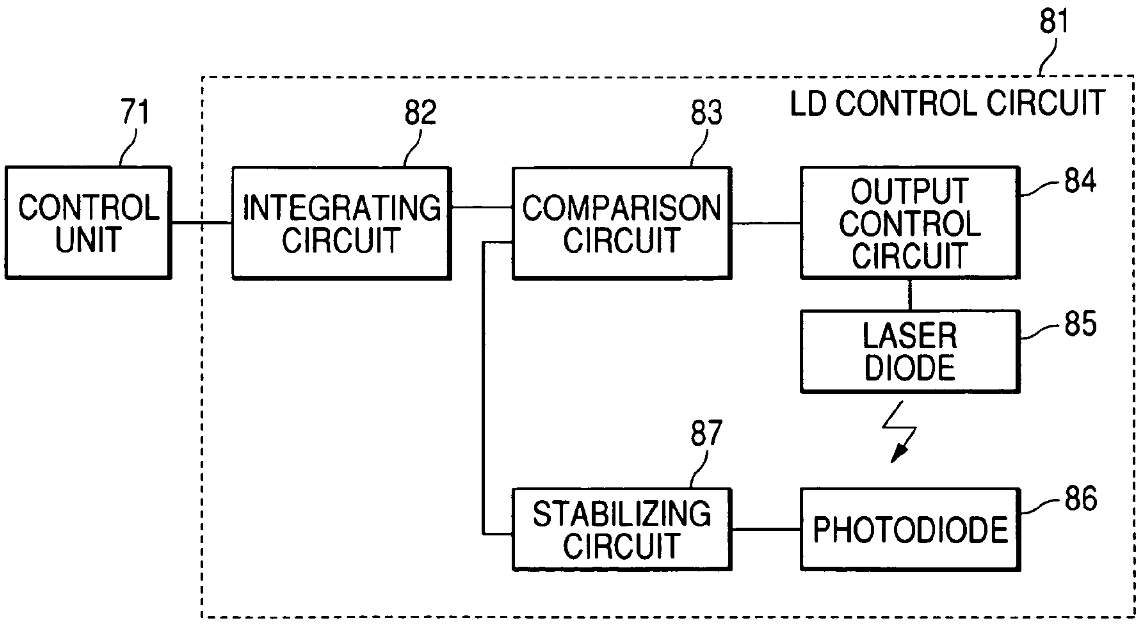
FIG. 3 is a block diagram functionally showing circuits that constitute an LD control circuit.

A detailed description will now be given of an LD control circuit 81 that is a component of the scanner unit 16 controlled by the control unit 71 with reference to FIG. 3. FIG. 3 is a block diagram functionally showing circuits that constitute the LD control circuit 81.

As shown in FIG. 3, the LD control circuit 81 includes an integrating circuit 82 (i.e., a reference voltage generating portion and an integrating circuit), a comparison circuit 83, an output control circuit 84 (i.e., an emitted-light quantity control circuit in cooperation with the comparison circuit 83), a laser diode 85 (i.e., a light emitting unit), a photodiode 86 (i.e., a detecting unit), and a stabilizing circuit 87.

Herein, the control unit 71 is formed to set the density of an image formed on the sheet of paper 3 by sending a pulse width modulation signal (PWM signal), which has a duty ratio corresponding to the density of the image formed thereon, to the LD control circuit 81.

The integrating circuit 82 inputs and integrates a PWM signal sent from the control unit 71, thereby producing a reference voltage that is a target value to set the density of the image (i.e., for the emitted-light quantity of the laser diode 85).

Thereafter, the comparison circuit 83, which is structured as, for example, a known operational amplifier, makes a comparison between a reference voltage produced by the integrating circuit 82 and a detecting voltage by the photodiode 86, and outputs a voltage corresponding to a comparison result.

The output control circuit 84 is formed by, for example, combining a transistor and a resistor, and supplies an electric current corresponding to the output voltage of the comparison circuit 83 to the laser diode 85.

The photodiode 86 then detects the quantity of light emitted from the laser diode 85, and generates an output corresponding to the emitted-light quantity of the laser diode 85.

The stabilizing circuit 87, which is made up of, for example, a capacitor and a transistor, makes it difficult for a noise to enter the comparison circuit 83, and stabilizes an output emitted from the laser diode 85 by fixing a voltage input to the comparison circuit 83 during an interval (during one scanning operation) where the laser diode 85 projects a laser beam onto the surface of the photosensitive drum 27.

With this structure, the LD control circuit 81 is set to perform the feedback control to control the quantity of light emitted from the laser diode 85 so that a reference voltage generated by the integrating circuit 82 and a detecting voltage detected by the photodiode 86 via the stabilizing circuit 87 coincide with each other.

Herein, the control unit 71 controllably changes the duty ratio of a PWM signal to be sent to the LD control circuit 81 (the integrating circuit 82), and controllably changes the reference voltage generated by the integrating circuit 82 when the density of an image formed on the sheet of paper 3 is changed (i.e., when a command to change the density of the image is input via the manipulation portion 73, or when a command to change the density of the image is input via the interface 75, or when a command to change the density of the image is included in the image data input via the interface 75).

However, if the duty ratio of the PWM signal is sharply changed, a potential difference between voltages compared by the comparison circuit 83 will become too large, and hence there is a possibility that an overcurrent will flow to the laser diode 85, or the laser diode 85 will not emit light. Therefore, in this aspect, the control unit 71 performs a process shown in FIG. 4, whereby the quantity of light emitted from the laser diode 85 can be excellently controlled.

Figures 4, 5:
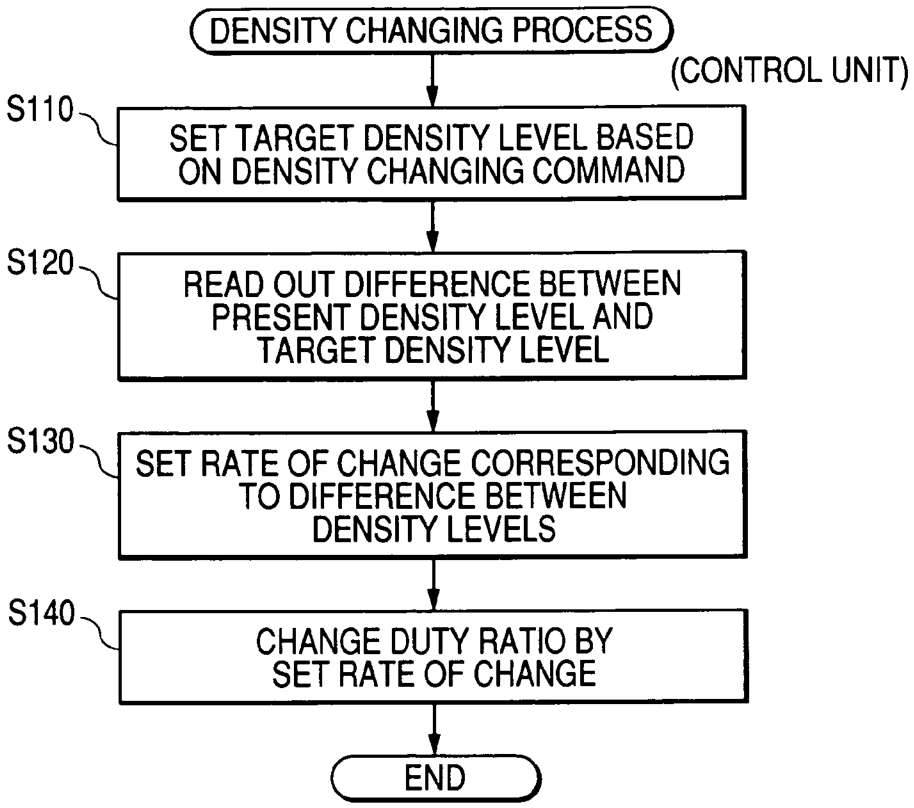
FIG. 4 is a flowchart showing a density-changing process.
FIG. 5 is an explanatory drawing showing a matrix used when a rate of change is set by density levels obtained before and after being changed.

FIG. 4 is a flowchart showing a density changing process performed by the control unit 71.

The density changing process of FIG. 4 is a process started when the control unit 71 detects a density changing command. First, in S110, density levels to be aimed (for example, six grades from Level 1 in which the density is lowest to Level 6 in which the density is highest) are set based on a density changing command.

Thereafter, the process proceeds to S120, where a step is performed to readout a difference between the present density level (before being changed) and a to-be-aimed density level (i.e., a difference between a reference voltage before being changed and a reference voltage after being changed).

For example, this step is performed such that a matrix formed by setting the density level before being changed and the to-be-aimed density level after being changed at the ordinate axis and the abscissa axis, respectively as shown in FIG. 5, is pre-stored in the ROM of the control unit 71, and a value determined according to the density level before being changed and the density level after being changed is extracted from this matrix.

For example, if the density level before being changed is “2,” and the density level after being changed is “4” in FIG. 5, value “2” is selected. In this aspect, in accordance with a difference between the density level before being changed and the density level after being changed, the same value corresponding thereto is set. Therefore, a value to be extracted is determined according to the number of grades by which the density level is changed.

Thereafter, in S130, the rate of change of the duty ratio corresponding to a difference (amount of change) between density levels is set based on the value read out from the matrix shown in FIG. 5. This rate of change is univocally determined according to the value read out from the matrix.

Thereafter, in S140, the duty ratio of the PWM signal is changed with the rate of change set above. When this change is completed, the density changing process is ended.

Figure 6A:
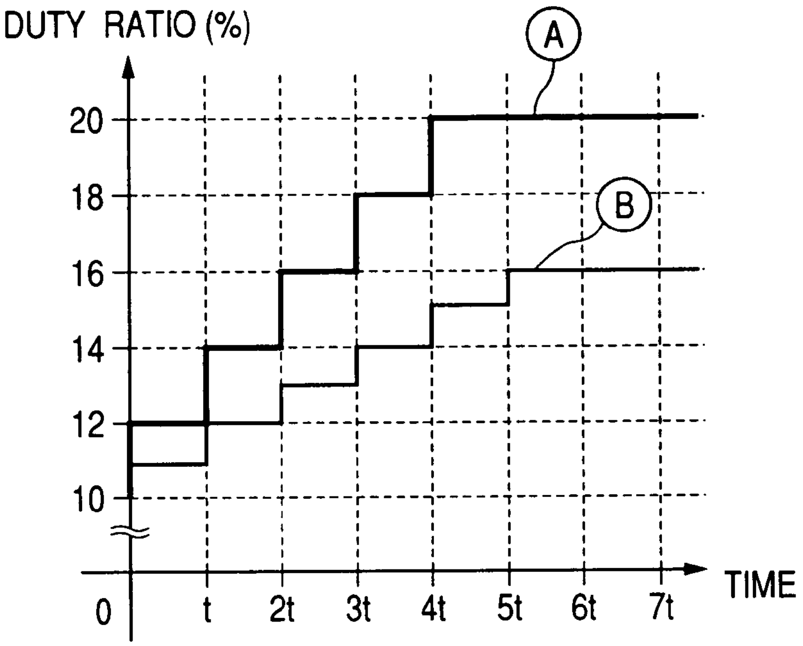
FIGS. 6A and 6B are graphs showing a relationship between time and a duty ratio of a PWM signal.
Figure 6B:
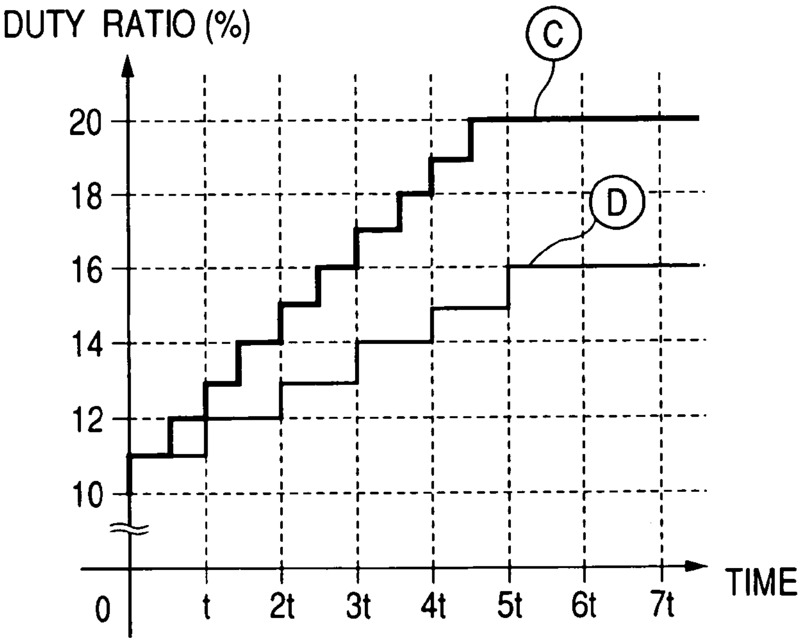

An example of the step performed in S140 will be described with reference to FIG. 6A. FIGS. 6A and 6B are graphs showing a relationship between time and the duty ratio of the PWM signal.

Concerning the relationship between the density level and the duty ratio of the PWM signal, the duty ratio with respect to the density level “1” is 10%, and the duty ratio with respect to the density level “6” is 20%. Let the density levels therebetween be appropriately set with intervals of 2% in the duty ratio. Herein, a description is given of an example in which the density level is changed from “1” to “6,” and an example in which the density level is changed from “1” to “4.”

When the density level is changed from “1” to “6,” (i.e., when value “5” is extracted from the matrix), the control unit 71 sets the duty ratio so as to be increased by 2% every unit time t seconds (e.g., every 10 ms).

In other words, when the step S140 of changing the density is started, the control unit 71 first allows the duty ratio of the PWM signal to be increased by 2% from 10%, and be kept at 12% until t seconds elapse as shown in "A" of FIG. 6A. When t seconds elapse, the duty ratio of the PWM signal is further increased by 2%. Subsequently, the control unit 71 allows the duty ratio of the PWM signal to be increased by 2% whenever t seconds elapse, and allows the duty ratio thereof to reach 20%, which is a duty ratio of the PWM signal to be aimed, when 4 t seconds elapse.

On the other hand, when the density level is changed from "1" to "4" (i.e., when "3" is extracted from the matrix), the control unit 71 sets the duty ratio so as to be increased by 1% every unit time t seconds (e.g., 10 ms).

In this case, when the step S140 of changing the density is started, the control unit 71 first allows the duty ratio of the PWM signal to be increased by 1% from 10%, and to be kept at 11% until t seconds elapse as shown in "B" of FIG. 6A. When t seconds elapse, the duty ratio of the PWM signal is further increased by 1%. Subsequently, the control unit 71 allows the duty ratio of the PWM signal to be increased by 1% whenever t seconds elapse, and to reach 16%, which is a duty ratio to be aimed, when 5 t seconds elapse.

The above-described printer 1 includes the scanner unit 16 that forms an electrostatic latent image by projecting light onto the surface of the charged photosensitive drum 27, the developing roller 31 that visualizes the electrostatic latent image formed by the scanner unit 16, and the transfer roller 30 that transfers a developer image visualized thereby onto the sheet of paper 3.

The scanner unit 16 includes the laser diode 85 that generates exposure light projected onto the surface of the photosensitive drum 27, the photodiode 86 that detects the quantity of light emitted from the laser diode 85, the control unit 71 and the integrating circuit 82 each of which generates a reference voltage set in accordance with a targeted value of the emitted light quantity of the laser diode 85, and the comparison circuit 83 and the output control circuit 84 each of which controls the emitted light quantity of the laser diode 85 so that a detection voltage detected by the photodiode 86 becomes equal to the reference voltage generated by the control unit 71 and the integrating circuit 82.

In the density changing process, when the density of the developer image is changed, the control unit 71 and the integrating circuit 82 are controlled so as to change the reference voltage generated by the control unit 71 and the integrating circuit 82 by stages at a predetermined rate from the present reference voltage to a new reference voltage based on the density obtained after being changed.

Therefore, according to the thus structured printer 1, in the density changing step, the control unit 71 changes the reference voltage generated by the control unit 71 and the integrating circuit 82 at a predetermined rate from the present reference voltage to the new reference voltage based on the density obtained after being changed, and hence the quantity of light emitted from the laser diode 85 can be improved in accuracy without making the structure complex.

Additionally, the control unit 71 is set to generate a pulse width modulation signal whose duty ratio is controlled in accordance with the density of a developer image, and the integrating circuit 82 is set to integrate the pulse width modulation signal produced by the control unit 71 so as to generate a reference voltage corresponding to the pulse width of the pulse width modulation signal.

Therefore, according to the thus structured printer 1, the reference voltage can be changed merely by changing the pulse width, and hence digital control can be easily performed by the computer (e.g., the control unit 71).

Additionally, in the density changing step executed by the control unit 71 in the printer 1, the rate of change according to which the reference voltage is changed is set in accordance with a potential difference between the present reference voltage and the new reference voltage based on the density obtained after being changed. Based on this rate of change, the reference voltage generated by the control unit 71 and the integrating circuit 82 is changed.

Especially in this aspect, in the density changing step executed by the control unit 71, the amount of change of the reference voltage per unit time is set in accordance with a potential difference between the present reference voltage and the new reference voltage based on the density obtained after being changed, and, based on this amount of change, the reference voltage generated by the control unit 71 and the integrating circuit 82 is changed in stages.

Therefore, according to the thus structured printer 1, the amount of change of a reference voltage can be arbitrarily set based on a potential difference between reference voltages obtained before and after being changed, and hence specifications that do not impose a load on the laser diode 85 and the photodiode 86 can be created in accordance with characteristics of the laser diode 85 and the photodiode 86.

Additionally, when the amount of change of the reference voltage is large, the rate of change of the voltage is set to be large, and hence the reference voltage can be changed for an almost constant time regardless of the amount of change of the reference voltage.

The present invention is not limited to the aforementioned aspect, and can be embodied in various forms as long as these are included in the technical scope of the present invention.

For example, in this aspect, the rate of change of the duty ratio to be set in the step S130 of changing the density is set so that the rate of change of the duty ratio per unit time corresponds to the amount of change of the density level. However, it is permissible that, for example, time intervals with which the duty ratio is changed are set in accordance with the amount of change of the density level, and the duty ratio of the PWM signal is changed by the pre-set amount of change per time interval set in this way.

In more detail, when the density level is changed from "1" to "6," the control unit 71 sets time intervals with which the duty ratio is increased at 0.5 t seconds. In this case, when the duty ratio is increased by one grade, the duty ratio is always increased by 1%.

Therefore, when the step S140 of changing the density is started, the control unit 71 first increases the duty ratio of the PWM signal by 1% from 10%, and keeps the duty ratio at 11% until 0.5 t seconds elapse as shown in "C" of FIG. 6B. When 0.5 t seconds elapse, the duty ratio of the PWM signal is further increased by 1%. Subsequently, whenever 0.5 t seconds elapse, the control unit 71 increases the duty ratio of the PWM signal by 1%, and allows the duty ratio to reach 20%, which is a duty ratio of the PWM signal to be aimed, when 4.5 t seconds elapse.

On the other hand, when the density level is changed from "1" to "4," the control unit 71 sets time intervals with which the duty ratio is increased at t seconds. Likewise, in this case, the duty ratio is always increased by 1% when the duty ratio is increased by one grade.

In this case, when the step S140 of changing the density is started, the control unit 71 first increases the duty ratio of the PWM signal by 1% from 10%, and keeps the duty ratio at 11% until t seconds elapse as shown in "D" of FIG. 6B. When t seconds elapse, the duty ratio of the PWM signal is further increased by 1%. Subsequently, whenever t seconds elapse, the control unit 71 increases the duty ratio of the PWM signal by 1%, and allows the duty ratio to reach 16%, which is a duty ratio of the PWM signal to be aimed, when 5 t seconds elapse.

The same effect as in the printer 1 according to the aforementioned aspect can be achieved even if the present invention is embodied in this way.

In addition, instead of using the integrating circuit 82 shown in FIG. 3, a D/A converter may be used.

What is claimed is:

1. An image forming apparatus comprising:

an exposure unit that forms an electrostatic latent image by projecting light onto a surface of an charged photosensitive member;

a developing unit that visualizes the electrostatic latent image formed by the exposure unit with developer; and a transferring unit that transfers a visualized image of the developer to an image recording medium;

wherein the exposure unit comprises:

a light emitting unit that generates the light projected onto the surface of the photosensitive member;

a detecting unit that detects a quantity of light emitted from the light emitting unit;

a reference voltage generating portion that generates a reference voltage set in accordance with a targeted value of the quantity of light emitted from the light emitting unit;

an emitted-light quantity control circuit that controls the quantity of light emitted from the light emitting unit so that a detection voltage detected by the detecting unit becomes equal to a value of the reference voltage generated by the reference voltage generating portion; and a reference voltage control portion that controls the reference voltage generating portion so as to change the reference voltage at a predetermined rate in stages from a present reference voltage to a new reference voltage, the new reference voltage being based on a density of the image of the developer obtained after being changed when the density is changed.

2. The image forming apparatus of claim 1, wherein the reference voltage generating portion includes:

a PWM signal generating portion that generates a pulse width modulation signal, whose duty ratio is controlled, in accordance with the density of the image of the developer; and an integrating circuit that integrates the pulse width modulation signal generated by the PWM signal generating portion and generates a reference voltage corresponding to a pulse width of the pulse width modulation signal.

3. The image forming apparatus of claim 1, wherein the reference voltage control portion sets a rate of change by which the reference voltage is changed in accordance with a potential difference between a present reference voltage and a new reference voltage based on a density obtained after being changed, and changes the reference voltage generated by the reference voltage generating portion based on the rate of change.

4. The image forming apparatus of claim 3, wherein the reference voltage control portion sets an amount of change of the reference voltage per unit time in accordance with a potential difference between the present reference voltage and the new reference voltage based on the density obtained after being changed, and changes the reference voltage generated by the reference voltage generating portion in stages based on the amount of change.

5. The image forming apparatus of claim 3, wherein the reference voltage control portion sets time intervals with which the reference voltage is changed in accordance with a potential difference between the present reference voltage and the new reference voltage based on the density obtained after being changed, and changes the reference voltage generated by the reference voltage generating portion in stages with the time intervals by a preset reference amount.

* * * * *